US012680634B2

(12) United States Patent
    Slunick et al.

(10) Patent No.:    US 12,680,634 B2
(45) Date of Patent:        Jul. 14, 2026

(54) OVER-MOLDED GROMMET FOR HOSE APPLICATIONS

(71) Applicant: Cooper Standard Automotive Inc., Northville, MI (US)

(72) Inventors: Steven T. Slunick, Clarkston, MI (US); Jerry J. Kephart, Allen Park, MI (US); Ralph Richardson, Gregory, MI (US)

(73) Assignee: Cooper-Standard Automotive Inc., Northville, MI (US)

( * ) Notice: Subject to any disclaimer, the term of this patent is extended or adjusted under 35 U.S.C. 154(b) by 0 days.

(21) Appl. No.: 18/983,870

(22) Filed: Dec. 17, 2024

(65) Prior Publication Data
    US 2026/0168600 A1      Jun. 18, 2026

(51) Int. Cl.
    *F16L 21/00*          (2006.01)
    *F16L 33/207*        (2006.01)
(52) U.S. Cl.
    CPC ........... *F16L 21/005* (2013.01); *F16L 33/207* (2013.01)
(58) Field of Classification Search
    CPC ....... F16L 21/005; F16L 33/34; F16L 33/003;

F16L 33/006; F16L 33/207; F16L 33/20; F16L 33/2071; F16L 33/2073; F16L 33/28; F16L 33/245; F16L 41/001; F16L 41/08; F16L 41/088; F16L 47/26; F16L 47/28; F16L 47/30; H02G 3/0468
See application file for complete search history.

(56) References Cited

U.S. PATENT DOCUMENTS

| | | |
|---|---|---|
| 10,207,432 B2 | 2/2019 | Courpet et al. |
| 10,718,453 B2 | 7/2020 | Herron et al. |
| 2024/0278624 A1* | 8/2024 | Kim ..................... B60H 1/3233 |

FOREIGN PATENT DOCUMENTS

| | | | | |
|---|---|---|---|---|
| EP | 2555364 A1 * | 2/2013 | ........... | H02G 3/0468 |

* cited by examiner

*Primary Examiner* — Aaron M Dunwoody
(74) *Attorney, Agent, or Firm* — Paschall & Associates, LLC; James C. Paschall

(57)                ABSTRACT

Disclosed herein is a hose connector assembly including a hose having a wall defining a lumen and having a first end, and a grommet molded to the hose at the first end and having an annular wall surrounding the hose and spaced therefrom by an annular gap. An insertion surface extends axially along the annular wall from an inner end to an outer end, and a return surface extends from the inner end to a bottom surface of the annular wall.

19 Claims, 7 Drawing Sheets

OVER-MOLDED GROMMET FOR HOSE APPLICATIONS

FIELD

The field is related to a process and apparatus for over molding a grommet onto a hose end to form an over-molded grommet and hose assembly and in particular a grommet and hose and assembly for use in forming fluid channels in vehicle systems.

BACKGROUND

There are numerous fluid conveyance systems required to operate wheeled vehicles such as automobiles, motorcycles, and trucks. Some fluid conveyance systems are pressurized while others are not. An example of a pressurized fluid conveyance system is a coolant system for a vehicle. Coolant systems for internal combustion engines use a coolant pump to drive coolant liquid through hoses, pipes, or tubing into contact with a heat generating component to remove heat from the component. The now heated coolant liquid is conveyed away from the component through the hoses, pipes, or tubing into a radiator where heat is exchanged to the environment. The cooled liquid is then returned through the hoses, pipes, or tubing to the heat generating component in a continuous cycle. Establishing a fluid pathway in a coolant system for an internal combustion engine can become quite complicated. Hoses must be cut to length and secured in place inside an engine compartment of a vehicle. Typically, grommets, connectors, elbows and tees are used to route the hose from location to location. The hose must maintain a fluid tight seal at each connection point to avoid leaks. An example of an unpressurized fluid conveyance system is a drain line.

At times it is required to convey fluid through a wall of a tank or other fluid vessel. Typically, a circular or oval inlet is provided in the wall. A grommet facilitates a fluid tight connection with the inlet, but the grommet must be attached to the hose in fluid tight securement prior to use. The step of attaching a grommet to a hose by hand or by machine is a time-consuming process that if not done properly can lead to leaks.

Thus, there is a need for a grommet and hose assembly that is in fluid-tight engagement that comes preassembled and is ready and easy to use.

SUMMARY

The disclosure relates to a hose connector assembly including a hose having a wall defining a lumen and having a first end. A grommet is molded to the hose at the first end and has an annular wall surrounding the hose and spaced therefrom by an annular gap. An insertion surface extends axially along the annular wall and terminates in an outer end. A return surface may extend from the insertion surface toward the annular wall.

The disclosure also relates to a grommet having an annular wall defining a through hole into a first cylindrical chamber having a first inner diameter. A second cylindrical chamber extends coaxially from the first cylindrical chamber and has a second inner diameter smaller than the first inner diameter. A tube extends coaxially from the second cylindrical chamber and has a third inner diameter smaller than the second inner diameter.

The disclosure also relates to a method for forming a hose connector assembly including the steps of: (1) providing a hose having a wall defining a lumen and having a first end; (2) providing a mold for forming a grommet; (3) positioning the first end into the mold; (4) delivering a flowable flexible material into the mold to form a grommet in securement with the hose; and, (5) wherein the grommet has a wall surrounding the hose and spaced therefrom by a gap.

While the following is described in conjunction with specific embodiments, it will be understood that this description is intended to illustrate and not limit the scope of the preceding description and the appended claims.

DETAILED DESCRIPTION

Figure 1:
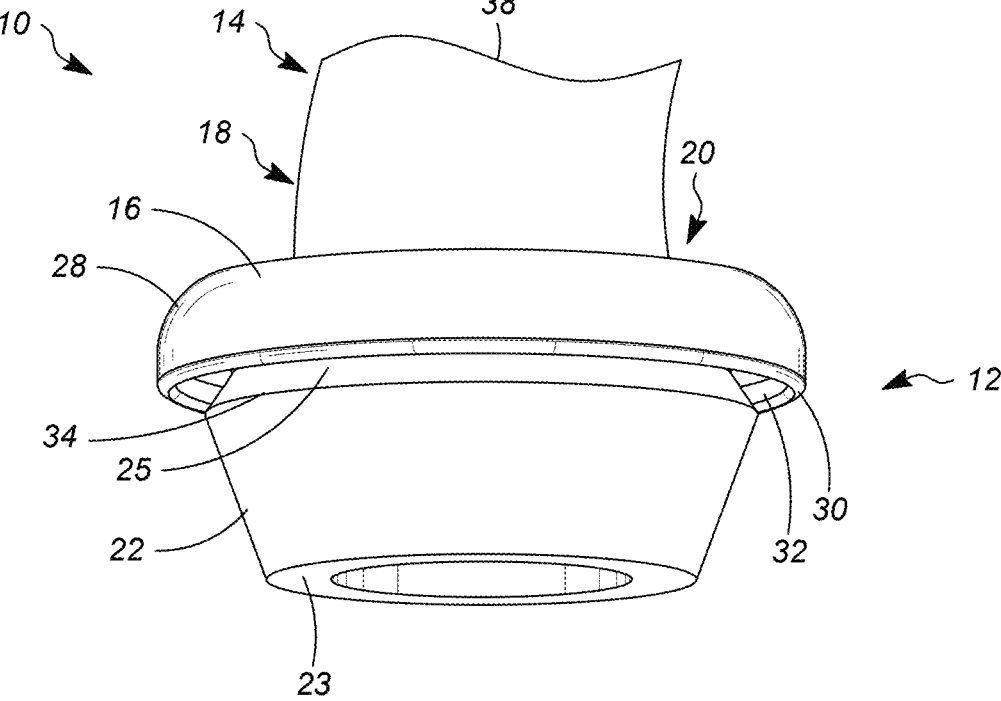
FIG. 1 is a perspective view of a grommet and hose assembly.

FIG. 1 shows a grommet and hose assembly 10 having a grommet 12 attached to a hose 14 in fluid tight securement. Preferably, the grommet 12 is molded onto a first end 18 of the hose 14 in an over-molding process described below. Thus, the grommet 12 and the hose 14 can be made from the same or different materials. It is also preferred to attach the grommet 12 to the hose 14 without the use of adhesives.

The grommet 12 has an annular wall 16 surrounding the first end 18 of the hose 14. An insertion surface 22 extends axially from the annular wall 16 and terminates in an outer end 23. Preferably, the insertion surface 22 tapers radially inwardly by decreasing in diameter as it approaches and bluntly terminates in the outer end 23 of the grommet 12. A return surface 25 extends from the insertion surface 22 and defines a crest 34 with the insertion surface 22. The return surface 25 extends from the insertion surface toward the annular wall. Preferably, the return surface 25 decreases diameter as it increases distance from the outer end 23 tapering radially outwardly. The annular wall 16 is generally round or oval in lateral cross section and has a radiused radial surface 28 that terminates in a sealing rim 30. An annular channel 32 extends circumferentially about the grommet 12 inwardly of the annular wall 16.

Figure 2:
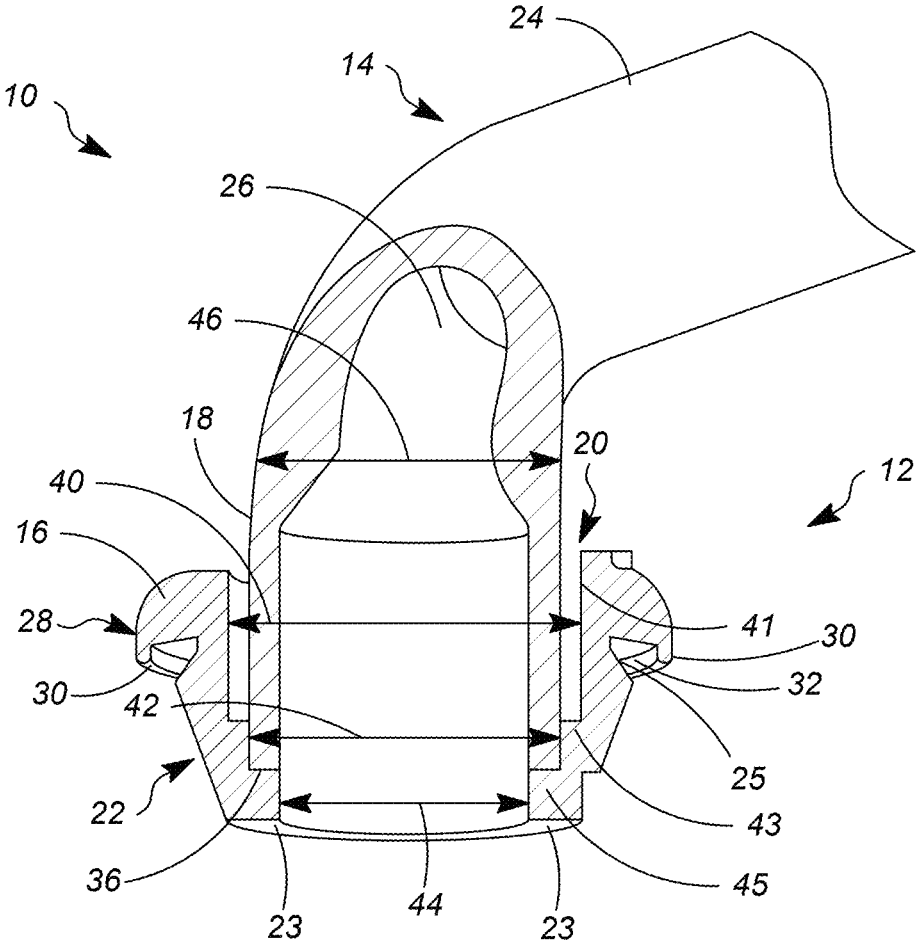
FIG. 2 is a perspective view of a grommet and hose assembly in partial cross-section.

FIG. 2 shows a longitudinal cross section of the grommet and hose assembly 10. A lumen 26 for carrying fluid runs through the hose 14 to the first end 18 of the hose 14. The annular wall 16 surrounds the first end 18 of the hose 14 and is spaced therefrom by an annular gap 20. The annular channel 32 is defined by the sealing rim 30 and the return surface 25. The sealing rim 30 provides a peripheral edge of the annular channel 32 and the return surface 25 defines a side wall of the annular channel 32.

The grommet 12 has a tiered structure having three cylinders stacked on top of each other with each successive cylinder having a smaller inner diameter than the one stacked inwardly of it. Thus, the first inner diameter 40 of the first cylinder 41 is larger than the second inner diameter 42 of the second cylinder 43 which, in turn, is larger than the third inner diameter 44 of the third cylinder 45. The second inner diameter 42 is dimensioned to fit around an outer diameter 46 of the hose 14 or, in other words, the second inner diameter 42 is generally equal to the outer diameter 46 of the hose 14. The first inner diameter 40 is larger than the outer diameter 46 of the hose 14 and defines the annular gap 20 between the hose and the annular wall 16. The hose 14 is separated from the first cylinder 41 by the annular gap 20. This arrangement allows for ease of insertion of the grommet 12 into an inlet 66 (FIG. 3) by allowing the grommet to flex radially inwardly during insertion thereby decreasing the insertion force. The third cylinder 45 has an inner surface that abuts the outer edge 36 of the hose 14. The third cylinder 45 provides a tube 45.

Figure 3:
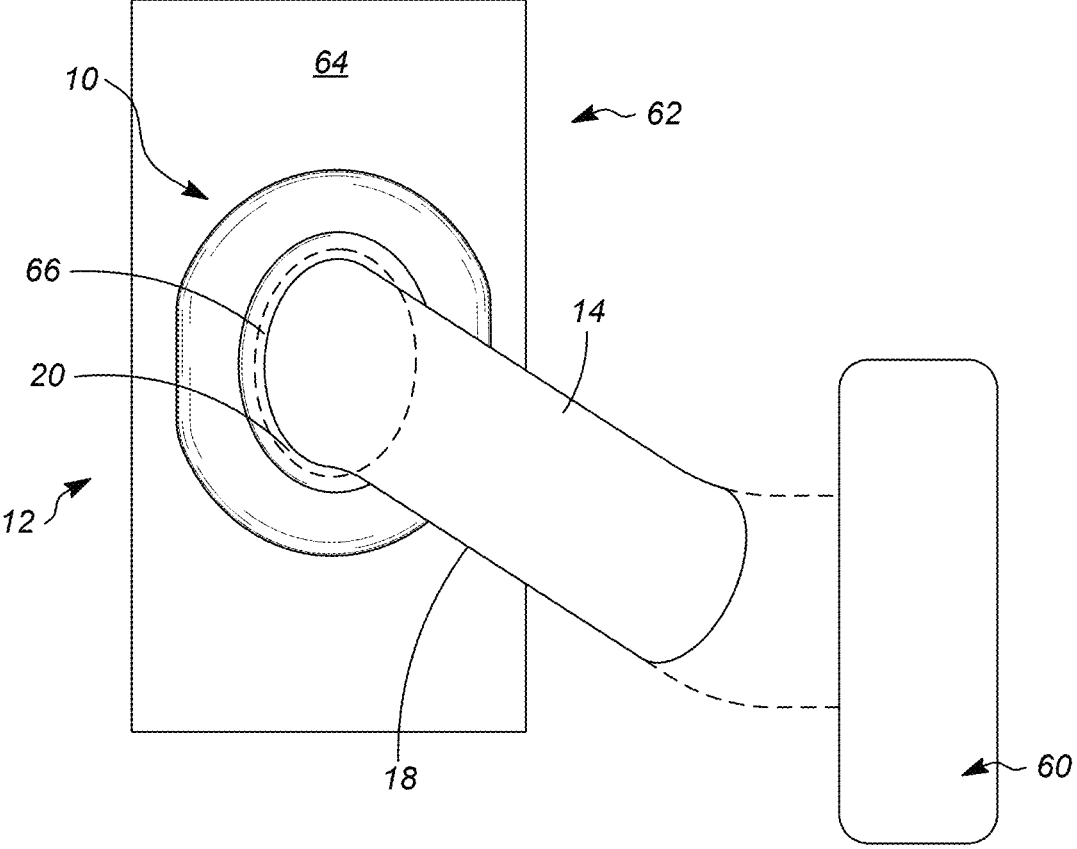
FIG. 3 is a top plan view of a grommet and hose assembly connecting a fluid source with a fluid destination.

FIG. 3 shows the grommet and hose assembly 10 is for connecting a fluid source 60 with a fluid destination 62 in fluid tight communication. The fluid source 60 is connected to the first end 18 of the hose 14. The fluid destination 62 has a wall 64 defining a fluid chamber with the inlet 66.

Figure 4:
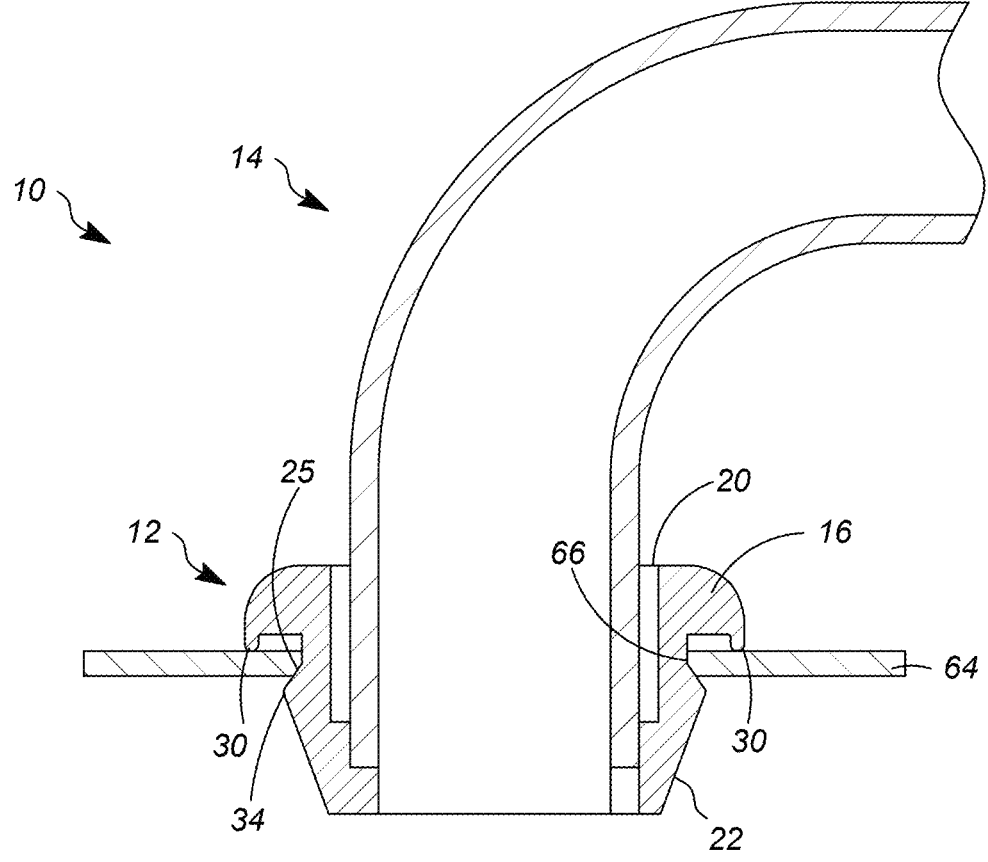
FIG. 4 is a side view in vertical cross section of a grommet and hose assembly inserted into an inlet of a fluid destination.

FIG. 4 shows the grommet 12 forming a fluid tight seal with the inlet 66 of the wall 64. It can be seen in FIG. 4 that during insertion of the grommet 12 into the inlet 66, the insertion surface 22 of the annular wall 16 rides along the inner edge of the inlet 66 and flexes radially inwardly permitted by the annular gap 20. As the crest 34 moves past the inlet 66, the return surface 25, which has a reverse slope to the insertion surface 22, allows the annular wall 16 to flex back radially and capture the inner edge of the inlet 66 between the return surface 25 and the sealing rim 30. The return surface 25 rests against the inner edge of the opening 66.

Figure 5:
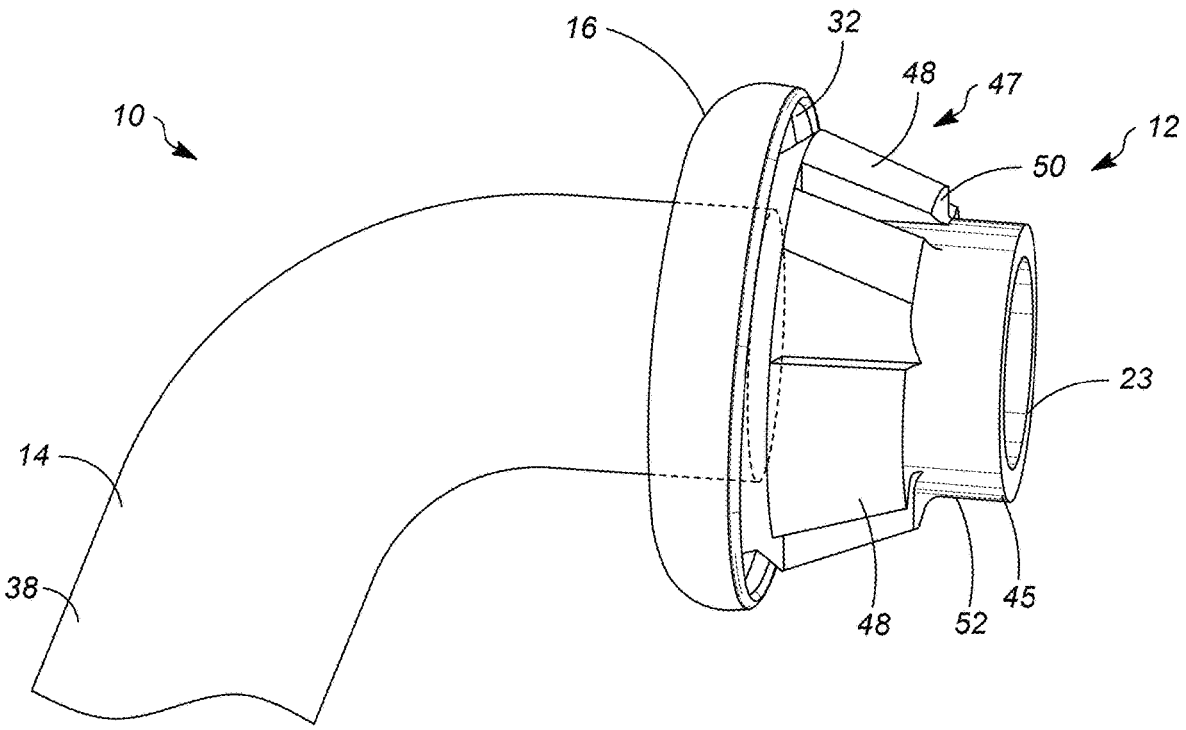
FIG. 5 is a perspective view of an alternative embodiment of a grommet and hose assembly.

FIG. 5 shows an alternative embodiment of the grommet and hose assembly 10. In this embodiment, the continuous outer surface 22 of FIG. 1 is replaced by a plurality of buttresses 47 circumferentially spaced about the tube 45. The buttresses 47 have a tapered outer surface 48 that terminates in an end 50, that is preferably blunt or flat in lateral direction. The tube 45 has a distal end 52 that may extend axially beyond the end 50 of the buttresses 47.

Figure 6:
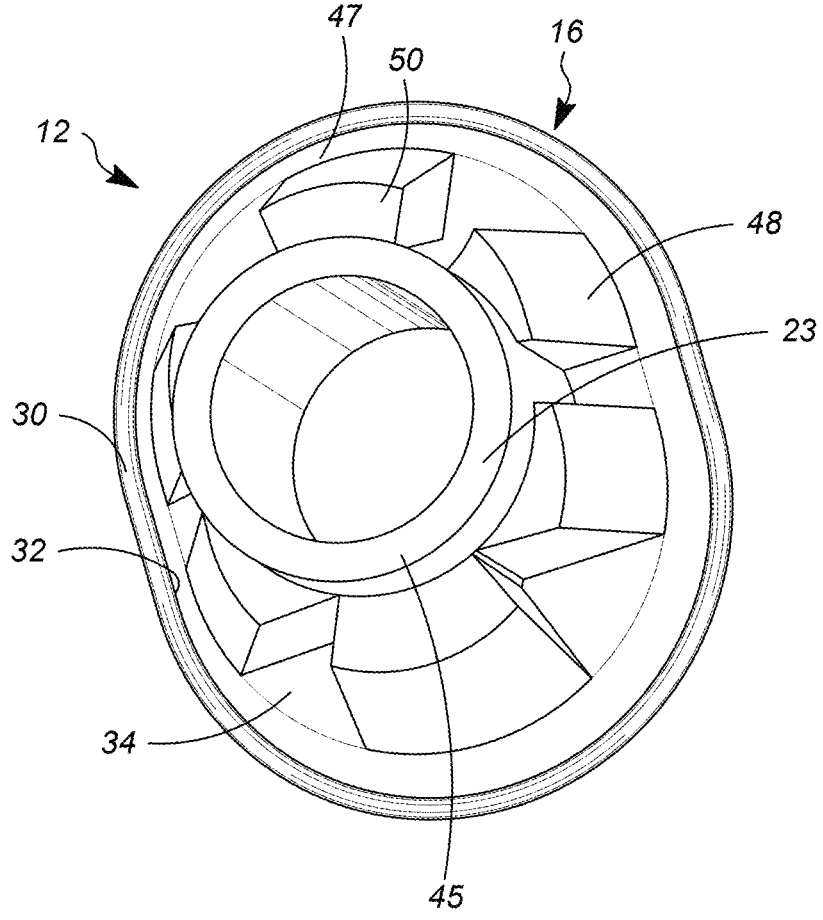
FIG. 6 is a perspective bottom, right-side view of a grommet.

FIG. 6 shows a bottom view of the grommet 12 of FIG. 5 having the annular wall 16, a plurality of buttresses 47 spaced about the tube 45 and in contact with an outer surface of the tube 45.

Figure 7:
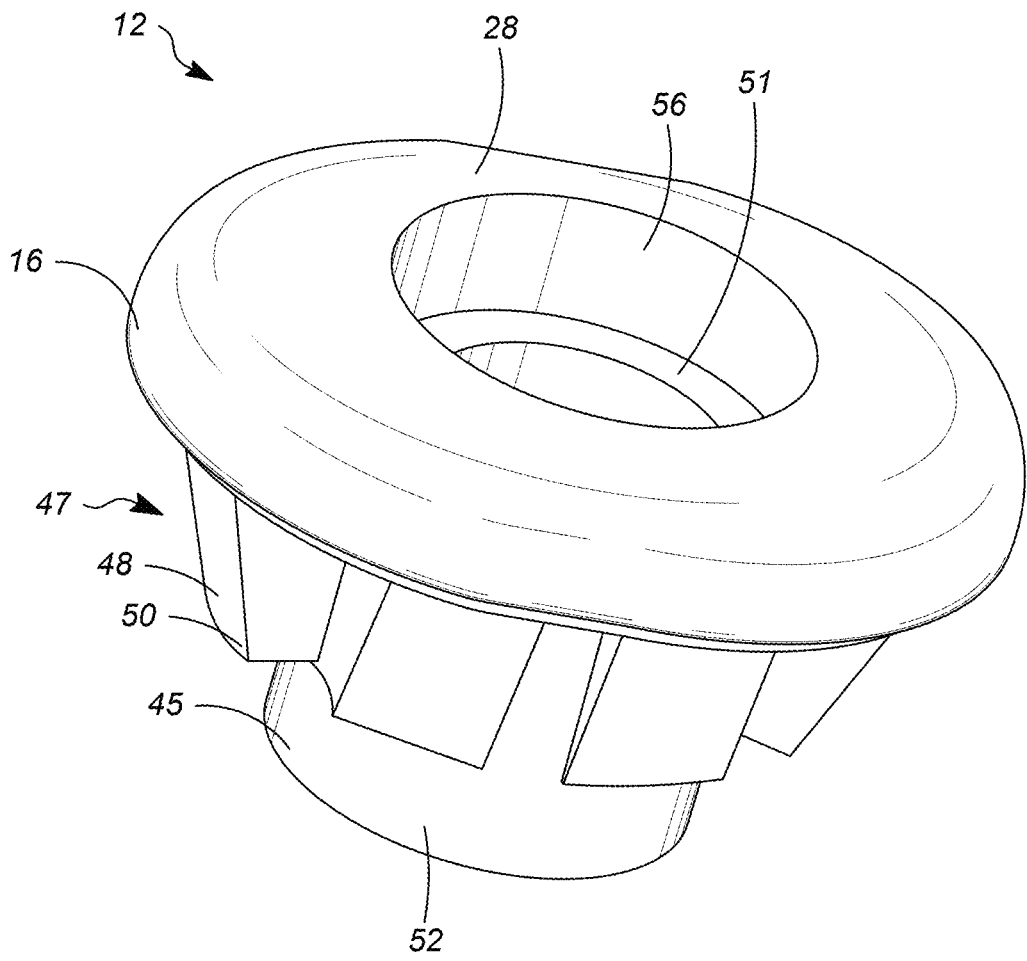
FIG. 7 is a perspective view of a front and a top of the grommet.

FIG. 7 shows a top of the grommet 12 having a socket 56 with a seat 51 of the tube 45 that serves as an end stop when the hose 14 is positioned in the socket 56. The seat 51 of the tube 45 attaches to the outer edge 36 of the hose 14 and the distal end 52 of the tube 45 extends axially beyond the end 50 of the buttresses 47.

The grommet and hose assembly 10 is preferably made in an over-molding process. The process includes the steps of: (1) providing a hose; (2) providing a mold having a cavity in the shape of the grommet 12; (3) cutting the first end 18 of the hose 14; (4) inserting the freshly cut first end 18 of the hose 14 into the mold; (5) optionally, forming the first end 18 into an oval shape, either before or after the step of inserting; (6) delivering a flowable flexible material into the mold to form the grommet 12 in fluid tight securement to the hose 14; and, (7) allowing the grommet and hose assembly 10 to cool and removing the grommet and hose assembly from the mold. The term "freshly cut" means that the hose 14 is used immediately after cutting, more preferably within from about 24 hours, even more preferably within 6 hours, yet even more preferably from within about 1 hour of cutting.

The hose 14 can be a monolayer or a multilayer structure and preferably is a monolayer. The hose 14 can be made from a thermoplastic or thermosetting materials. The hose 14 is typically formed in an extrusion or coextrusion process. One preferred compound of the hose is a thermosetting rubber and more preferably an ethylene propylene diene monomer (EPDM).

The grommet 12 can also be fabricated from a thermoplastic or thermosetting material that is compatible with the hose material. One preferred compound of the hose 14 is a thermosetting rubber and more preferably an ethylene propylene diene monomer (EPDM). Suitable EPDM compounds for both the hose 14 and the grommet 12 are sulfur cured systems. The viscosity and curing behaviors of the EPDM are tuned for the process type. Faster cure for injection molding and slower cure to withstand heat history in the extrusion process. Lower viscosity for the molding compound is used to improve mold flow and 'wetting' contact with the previously cured extrusion. The molding compound optionally contains a small amount (<1 wt %) of an additive that acts as a cross-linkable plasticizer (reactive plasticizer). This material can serve several purposes in rubber but most likely is added to improve flow and surface appearance.

Without further elaboration, it is believed that using the preceding description that one skilled in the art can utilize the present disclosure to its fullest extent and easily ascertain the essential characteristics of this disclosure, without departing from the spirit and scope thereof, to make various changes and modifications of the present disclosure and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

The invention claimed is:

1. A hose connector assembly comprising:
   a hose having a wall defining a lumen and having a first end; and
   a grommet molded to the hose at the first end and having an annular wall surrounding the hose and spaced therefrom by an annular gap, an insertion surface extends axially along the annular wall and terminates in an outer end; and
   wherein the grommet is of a different material from the hose.

2. The assembly of claim 1 wherein the insertion surface is tapered.

3. The assembly of claim 2 wherein the outer end extends axially beyond the first end of the hose.

4. The assembly of claim 3 further comprising a return surface extending from the insertion surface toward the annular wall.

5. The assembly of claim 1 wherein the insertion surface is adapted to be inserted into an opening permitted by the annular gap and the return surface rests against an inner surface of the opening upon insertion.

6. The assembly of claim 5 wherein each of the buttresses has a tapered surface.

7. The assembly of claim 1 wherein the annular wall is radiused.

8. The assembly of claim 1 wherein the annular wall has a peripheral edge and further comprising a sealing rim extending axially toward the outer end.

9. The assembly of claim 1 wherein the grommet includes a tube in communication with the lumen.

10. The assembly of claim 9 wherein the tube is coaxially disposed with the lumen.

11. The assembly of claim 1 wherein there is no adhesive between the hose and the grommet.

12. A grommet comprising:

an annular wall defining a through hole into a first cylindrical chamber having a first inner diameter, a second cylindrical chamber extends coaxially from the first cylindrical chamber and has a second inner diameter smaller than the first inner diameter, and a tube extends coaxially from the second cylindrical chamber and has a third inner diameter smaller than the second inner diameter; and wherein the annular wall has a peripheral edge and a sealing rim extending axially toward the outer end.

13. The grommet of claim 12 wherein the grommet is for connecting to a hose having an outer diameter generally equal to the second inner diameter.

14. The grommet of claim 12 further comprising an outer surface connecting the first cylindrical chamber, the second cylindrical chamber and the third cylindrical chamber.

15. The grommet of claim 14 wherein the outer surface is tapered.

16. A method for forming a hose connector assembly comprising:

providing a hose having a first wall of a first material defining a lumen and having a first end;

providing a mold for forming a grommet;

positioning the first end into the mold;

delivering a flowable flexible second material different from the first material into the mold to form a grommet in securement with the hose; and, wherein the grommet has a second wall surrounding the hose and spaced therefrom by a gap.

17. The method of claim 16 further comprising the step of cutting the first end of the hose prior to the step of positioning the first end into the mold.

18. The method of claim 16 wherein there is no adhesive between the hose and the grommet.

19. The method of claim 16 wherein the second wall is tapered.

* * * * *